United States Patent
Tasfi

(10) Patent No.: US 10,089,717 B2
(45) Date of Patent: Oct. 2, 2018

(54) IMAGE SCALING USING A CONVOLUTIONAL NEURAL NETWORK

(71) Applicant: Flipboard, Inc., Palo Alto, CA (US)

(72) Inventor: Norman Tasfi, London (CA)

(73) Assignee: Flipboard, Inc., Palo Alto, CA (US)

( * ) Notice: Subject to any disclaimer, the term of this patent is extended or adjusted under 35 U.S.C. 154(b) by 193 days.

(21) Appl. No.: 15/091,274

(22) Filed: Apr. 5, 2016

(65) Prior Publication Data

US 2017/0287109 A1    Oct. 5, 2017

(51) Int. Cl.
*G06T 3/40* (2006.01)
*G06K 9/62* (2006.01)

(52) U.S. Cl.
CPC .......... *G06T 3/4046* (2013.01); *G06K 9/6215* (2013.01); *G09G 2340/0407* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 9,911,067 | B2 * | 3/2018 | Hikida | G06K 9/6267 |
| 2007/0040845 | A1 * | 2/2007 | Choo | G09G 5/02 |
| | | | | 345/589 |
| 2007/0211064 | A1 * | 9/2007 | Buck | G06N 3/08 |
| | | | | 345/519 |
| 2016/0104053 | A1 * | 4/2016 | Yin | G06K 9/00228 |
| | | | | 382/156 |
| 2016/0140424 | A1 * | 5/2016 | Wang | G06K 9/66 |
| | | | | 382/156 |
| 2016/0171346 | A1 * | 6/2016 | Han | G06K 9/66 |
| | | | | 382/103 |
| 2016/0321784 | A1 * | 11/2016 | Annapureddy | G06K 9/66 |
| 2017/0200063 | A1 * | 7/2017 | Nariyambut Murali | G06K 9/4628 |
| 2017/0347061 | A1 * | 11/2017 | Wang | H04N 7/0117 |
| 2017/0347110 | A1 * | 11/2017 | Wang | H04N 19/36 |

* cited by examiner

*Primary Examiner* — Hilina K Demeter
(74) *Attorney, Agent, or Firm* — Fenwick & West LLP

(57) ABSTRACT

An online content system, such as a digital magazine, includes an image scaling engine for increasing the resolution of images. The image scaling engine comprises a convolutional neural network. An input image is preprocessed for use as inputs to a convolutional neural network (CNN). The preprocessed input image pixel values are used as inputs to the CNN. The CNN comprises convolutional layers and dense layers for determining image features and increasing image resolution. The CNN is trained using backpropagation to adjust model weights and biases. Each convolutional layer of a CNN detects features in an image by comparing image subregions to a set of known kernels and determining similarities between subregions and kernels using a convolution operation. The dense layers of the CNN have full connections to all of the outputs of a previous layer to determine the specific target output result such as output image pixel values.

12 Claims, 5 Drawing Sheets

IMAGE SCALING USING A CONVOLUTIONAL NEURAL NETWORK

BACKGROUND

This invention relates generally to increasing the resolution of images for a digital magazine.

In a digital magazine, high quality images improve the user experience. Lower resolution images introduce anomalies such as pixelation, over smoothing, and artifacts when scaled above 100%, which reduce image quality. Typical scaling algorithms, including bicubic, bilinear, and nearest-neighbor interpolation, perform mathematical operations to scale image pixels to the desired size. Many algorithms perform an interpolation between pixel values to create a transition. These algorithms use the surrounding pixels to guess what the missing values should be in the new image. The problem in the case of scaling the image to a larger size is when there are too many new values to be filled in the image. These algorithms try to make guesses of what the new values should be but this introduces errors in the process which lead to noise, haloing, and artifacts.

SUMMARY

An online content system, such as a digital magazine, includes an image scaling engine for increasing the resolution of images using a convolutional neural network (CNN). The image scaling engine receives an input image and returns an output image that is a scaled version of the input image.

A preprocess module of the image scaling engine preprocesses pixel values of the input image for use as inputs to the CNN. Preprocessing may include statistical analysis such as determining minimum values, mean values, and maximum values of pixels so that pixels can be scaled appropriately for the CNN. For example, pixel values may be changed from color values (e.g., 0-255) to scaled values between -1 and 1. This reduces computational load during operation of the CNN by avoiding calculations involving very large numbers. The CNN comprises convolutional layers and dense or fully connected layers. The outputs of the CNN are pixel values for an output image that is a scaled version of the input image.

A CNN module of the image scaling engine receives preprocessed input pixel values and outputs output image pixel values. In one embodiment, the CNN comprises three convolutional layers and four dense layers. The CNN further comprises a dense layer with linear Gaussian units to calculate the final output image. The linear Gaussian dense layer considers the noise within the training dataset in conjunction with the calculated response to achieve a more robust value out of the unit when doing regression. Each layer of the CNN comprises one or more units or nodes that perform nonlinear mathematical operations on one or more inputs to the layer. Each input has a weight that is determined by a training module of the image scaling engine using backpropagation. Each layer further includes a scalar bias value that can be used to offset the weighted inputs. The inputs to the first layer are the preprocessed input pixel values. The inputs to the successive layers are the outputs of the preceding layer. The outputs of the final layer are the output image pixel values. No pooling operations are used after any of the convolutional layers. While pooling is useful for classification tasks, where invariance to input is important, the location of features detected by each kernel is important in the present embodiments, so pooling is not appropriate.

Each convolutional layer of a CNN detects features in an image by comparing image subregions to a set of known kernels and determining similarities between subregions and kernels using a convolution operation. The dense layers of the CNN have full connections to all of the outputs of a previous layer to determine the specific target output result such as output image pixel values.

The training module trains the CNN using supervised learning, which trains a network based on known input-output combinations. The training module receives a training image and scales down the training image to create an input training image such that the training image represents an ideal output of the CNN that has the input training image as an input. The input training image is scaled by the CNN module, which returns an output training image. The training module compares the output training image to the training image using a cost function such as the mean squared error function. The training module uses backpropagation to adjust the weights and bias values for each layer. In one embodiment, the training module adjusts weights and biases using gradient descent to minimize the error function.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, images, videos, products for sale, user-generated content (e.g., content posted on a social networking system), advertisements, and any other types of content capable of display within the context of a digital magazine.

System Architecture

Figure 1:
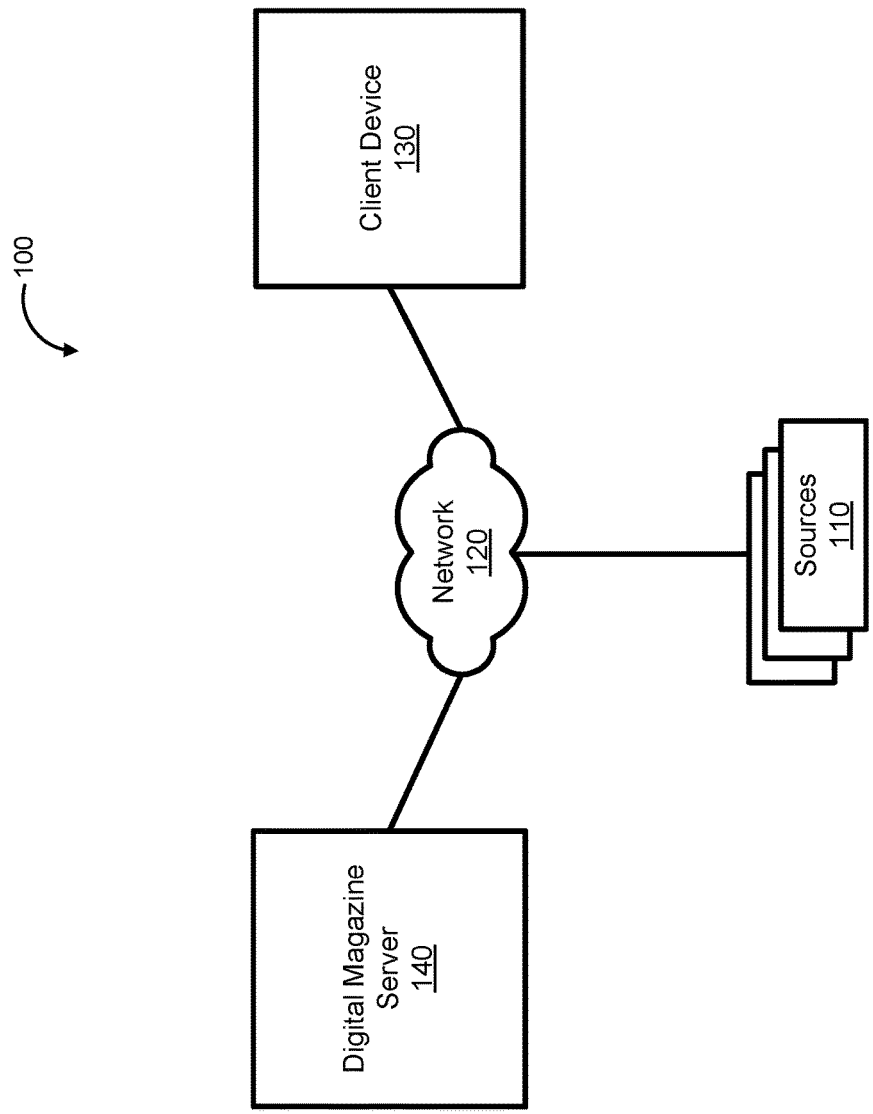
FIG. 1 is a block diagram of a system environment for a digital magazine server according to one embodiment.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to client devices 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device of the client device 130 presents content items to a user of the client device 130. Examples of the display device include a liquid crystal display (LCD), a light emitting diode (LED) display, an active matrix liquid crystal display (AMLCD), or any other suitable device. Different client devices 130 may have display devices with different characteristics. For example, different client devices 130 have display devices with different display areas, different resolutions, or differences in other characteristics.

The digital magazine server 140 receives content items from one or more sources 110, generates pages in a digital magazine by processing the received content, and provides the pages to the client device 130. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Figure 2A:
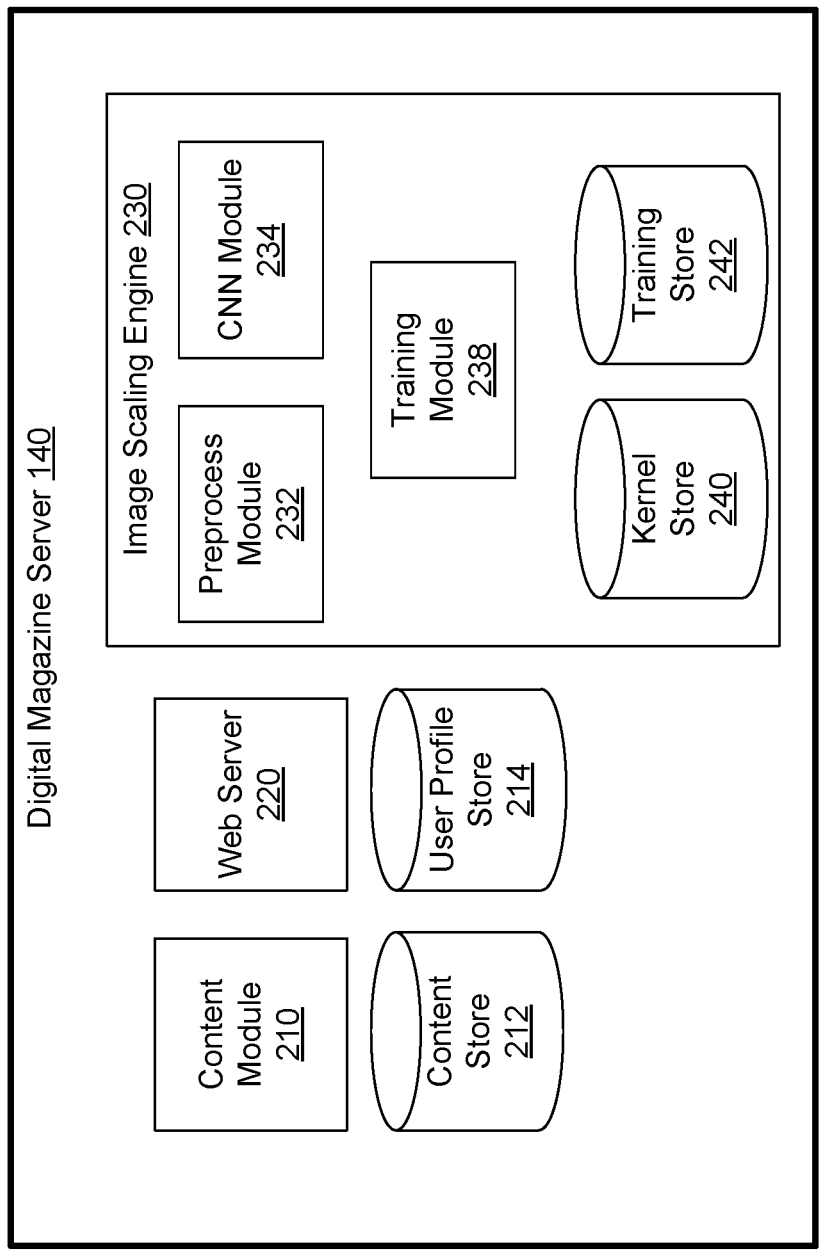
FIG. 2A is a block diagram of a digital magazine server that includes an images scaling engine according to one embodiment.

FIG. 2A illustrates an embodiment of a digital magazine server that includes an image scaling engine. The content module 210 generates one or more pages for presentation to a user based on content items obtained from one or more sources 110 and information describing organization and presentation of content items. For example, the content module 210 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items.

The web server 220 links the digital magazine server 140 via the network 120 to the one or more client devices 130, as well as to the one or more sources 110. The web server 220 serves web pages, as well as other content, such as JAVA®, FLASH®, XML, and so forth. The web server 220 may retrieve content items from one or more sources 110. Additionally, the web server 220 communicates instructions for generating pages of content items and instructions for processing received input from the content module 210 to a client device 130 for presentation to a user. The web server 220 also receives requests for content or other information from a client device 130 and communicates the request or information to components of the digital magazine server 140 to perform corresponding actions. Additionally, the web server 220 may provide application programming interface (API) functionality to send data directly to native client device operating systems, such as IOS®, ANDROID™, WEBOS®, or BlackberryOS.

The content store 212 stores objects that each represent various types of content. For example, the content store 212 stores content items received from one or more sources 110 within a threshold time of a current time. Examples of content items stored by the content store 212 include a page post, a status update, a photograph, a video, a link, an article, video data, audio data, a check-in event at a location, or any other type of content.

Each user of the digital magazine server 140 is associated with a user profile, which is stored in the user profile store 214. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 214 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 214 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The image scaling engine 230 scales images to a larger size using a trained model for inclusion in pages in a digital magazine. The image scaling engine 230 receives input images from various sources, including, for example, the content module 210, the content store 212, sources 110 and client devices 130. The image scaling engine scales input images by increasing the resolution of the images and returns scaled output images. For example, if an input image has dimensions of 100 pixels by 100 pixels, the scaled output image may have dimensions of 200 pixels by 200 pixels. In one embodiment, the image scaling engine 230 utilizes a machine learning model such as a convolutional neural network (CNN) to scale images. In FIG. 2A, the image scaling engine 230 is shown as a module of the digital magazine server 140 for purposes of illustration, but in various embodiments, the image scaling engine may be located at a client device 130, a source 110, or another location.

The preprocess module 232 of the image scaling engine preprocesses pixel values of the input image for use as inputs to the CNN module 234. Preprocessing may include statistical analysis such as determining minimum values, mean values, and maximum values of pixels so that pixels can be scaled appropriately for the CNN. For example, pixel values may be changed from color values (e.g., 0-255) to scaled values between −1 and 1. This reduces computational load during operation of the CNN by avoiding calculations involving very large numbers.

Figure 2B:
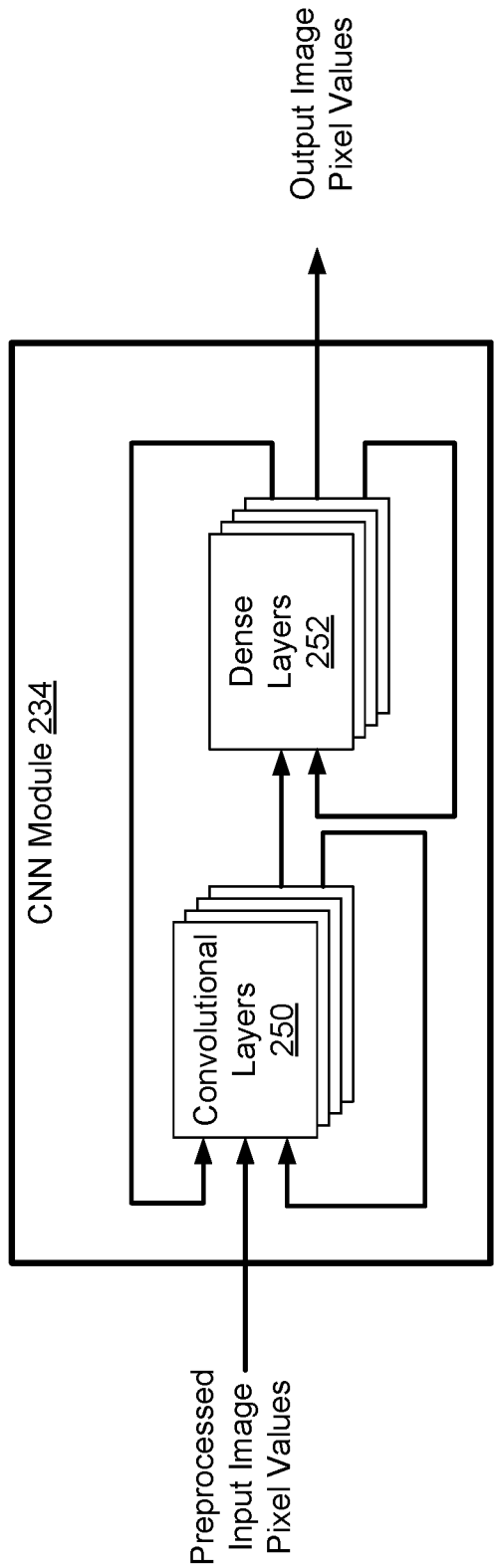
FIG. 2B illustrates an embodiment of a Convolutional Neural Network (CNN) module according to one embodiment.

The CNN module 234 receives preprocessed input pixel values and outputs output image pixel values. FIG. 2B illustrates an embodiment of a CNN module 234 according to one embodiment. The CNN module 234 comprises convolutional layers 250 and dense layers 252 that make up a CNN. As shown by the arrows in FIG. 2B, the convolutional layers 250 and the dense layers 252 may be connected to one another in various ways. For example, a convolutional layer 250 may receive as inputs outputs from another convolutional layer 250, outputs from a dense layer 252, or original input image pixel values. A dense layer 252 may receive as inputs outputs from another dense layer 252 or outputs from a convolutional layer 250. In another embodiment, a dense layer 252 receives as inputs the original input image pixel values.

In one embodiment, the CNN comprises three convolutional layers 250 and four dense layers 252. The CNN further comprises a dense layer 252 with linear Gaussian units to calculate the final output image. Each layer of the CNN comprises one or more units or nodes that perform nonlinear mathematical operations on one or more inputs to the layer. Each input has a weight that is determined by the training module 238 using backpropagation. Each unit further includes a scalar bias value that can be used to offset the weighted inputs. Thus, each output of a unit is the dot product of the inputs with each respective weight plus the bias value. The inputs to the first layer are the preprocessed input pixel values. The inputs to the successive layers are the outputs of the preceding layer. The outputs of the final layer are the output image pixel values. The linear Gaussian dense layer considers the noise within the training dataset in conjunction with the calculated response to achieve a more robust value. The values are modelled by a linear function of the previous layer with the addition of Gaussian noise. The Gaussian noise is sampled from a distribution where the mean and variance is equal to that of the training dataset sample mean and covariance matrix respectively.

Each convolutional layer of a CNN detects features in an image by comparing image subregions to a set of known kernels and determining similarities between subregions and kernels using a convolution operation. Each of the kernels in the set of kernels represents a feature that may be present in the image. Kernels represent image features as numerical values, for example as a matrix, and may be stored in kernel store 240. A kernel may be expressed as a matrix with the same dimensions as a subregion. When a kernel is compared to a subregion, the output of the convolution operation represents a similarity value between the subregion and the kernel. The higher the similarity value, the more the subregion resembles the kernel. The presence of the feature represented by the kernel in the subregion is estimated by the similarity value. Kernels in earlier convolutional layers represent simpler image features such as lines, corners and edges. Kernels in later convolutional layers represent more complex features that are based on the simpler features. In each successive convolutional layer, kernels represent features that use the kernels of earlier layers as building blocks. A feature map may be created by combining the similarity values for a kernel for each subregion in the image. The feature map indicates the positions at which the feature is present in the image, with the similarity values providing a measure of the degree to which a feature is present at a particular position. When combined with feature maps for other kernels, the image can be reconstructed by expressing each subregion as a weighted combination of the kernels for the subregion. Depending on the embodiment, the parameters defining how kernels are weighted in the combination of kernels are defined by the similarity value, bias values, or the training module 238.

The dense layers of the CNN have full connections to all of the outputs of a previous layer to determine the specific target output result such as output image pixel values. Dense layers may be substituted with convolutional layers with 1×1 kernels to achieve the same result of a fully connected layer.

The training module 238 trains the CNN using supervised learning, which trains a network based on known input-output combinations. The training module 238 receives a training image and scales down the training image to create an input training image such that the training image represents an ideal output of the CNN that has the input training image as an input. The input training image is scaled by the CNN module, which returns an output training image. The training module compares the output training image to the training image using a cost function such as the mean squared error function. The training module 238 uses backpropagation to adjust the weights and bias values for each layer. In one embodiment, the training module adjusts weights and biases using gradient descent to minimize the error function. Model equations, weights and bias values are stored in training store 242 for retrieval by CNN module 234.

Figure 3:
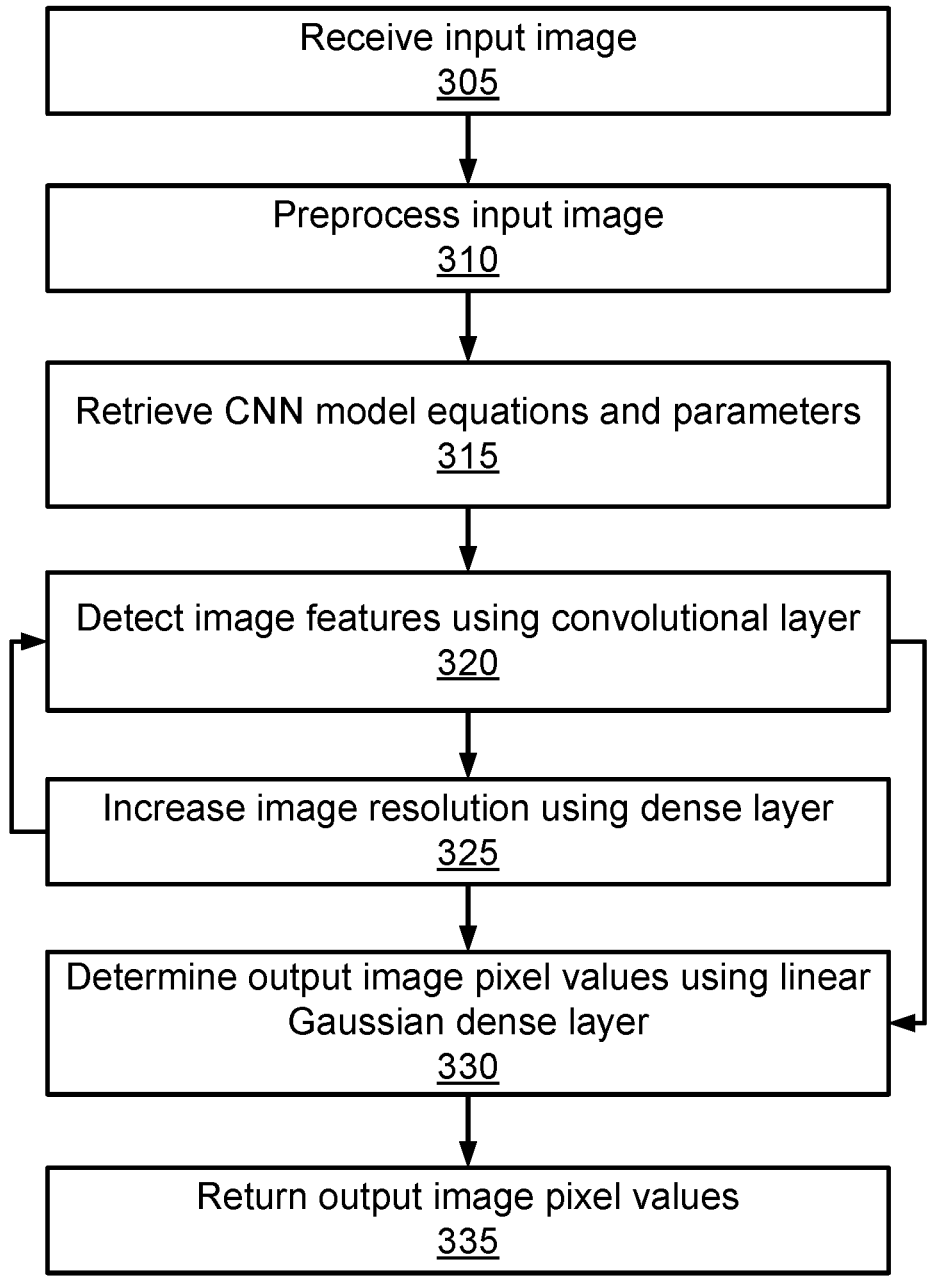
FIG. 3 is a flowchart illustrating an embodiment of a process for increasing the resolution of an image for presentation in a digital magazine.

FIG. 3 is a flowchart illustrating an embodiment of a process for increasing the resolution of an image for presentation in a digital magazine. The image scaling engine 230 receives 305 an input image. The preprocess module 232 preprocesses the input image to extract and modify input image pixel values for input to the CNN. For example, if an input image has dimensions of 100 pixels by 100 pixels, the image may be expressed as a 100×100 matrix with each entry corresponding to a pixel. The color values may be expressed as an 8-bit value (e.g., 0-255) or other color value (e.g., 16-bit, 24-bit, etc.). In one embodiment, the preprocess module 232 normalizes color values in the matrix, for example to values between 0 and 1. This allows the image scaling engine 230 to consistently process image data received in a variety of formats. This may additionally increase computational efficiencies for the image scaling engine 230 by, for example, reducing "blowouts" in which computed values approach infinity.

The CNN module 234 retrieves 315 model equations, weights, and bias values from training store 242. The CNN module 234 receives the input image pixel values from the preprocess module 232 and uses the values as inputs to the CNN. The CNN module 234 detects 320 image features using a convolutional layer. The CNN module 234 increases 325 the image resolution using a dense layer. Steps 320 and 325 may be performed multiple times in many different orders to optimize model performance. The CNN module 324 determines 330 the output image pixel values using a dense layer with linear Gaussian units, and returns 335 the output image pixel values to the image scaling engine 230. The image scaling engine 230 may modify the output image pixel values to match the format or other characteristics of the input image before outputting the scaled output image.

Figure 4:
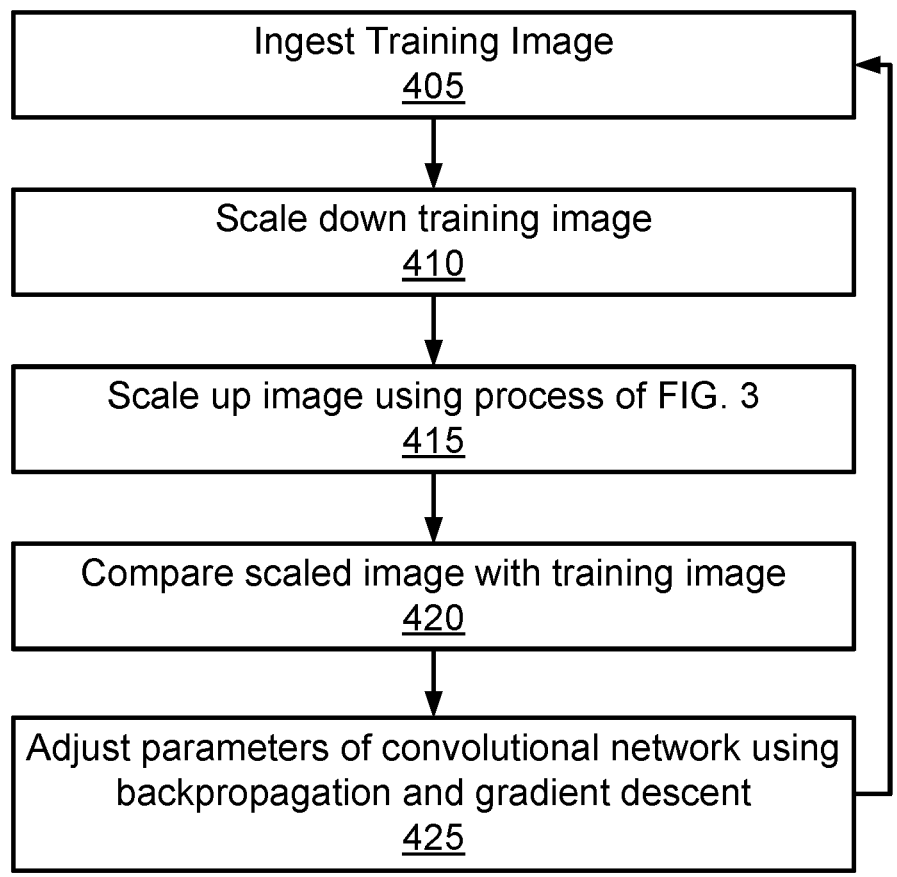
FIG. 4 is a flowchart illustrating an embodiment of a process for training the convolutional neural network for increasing the resolution of an image for presentation in a digital magazine.

FIG. 4 is a flowchart illustrating an embodiment of a process for training the convolutional neural network for increasing the resolution of an image for presentation in a digital magazine. The image scaling engine 230 ingests 405 a training image. The image scaling engine 230 scales down 410 the training image to an input image for processing by the image scaling engine. The image scaling engine 230 scales up the input image to the same size as the training image using the scaling process of FIG. 3. The image scaling engine 230 compares 420 the output scaled image from step 415 with the training image 420 using an error function such as the mean squared error function. The image scaling engine 230 adjusts 425 the parameters for the convolution operations according to the comparison using backpropagation. In one embodiment, the amount of adjustment to each weight and bias is calculated through gradient descent. The goal is to minimize the error function, so ideally, the training image would match the scaled input image exactly. The training module may repeat this process multiple times with multiple images to minimize the mean square error function.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for image scaling for a digital magazine comprising:
   receiving a training image;
   scaling down the training image by reducing a resolution thereof;
   changing a pixel value of each pixel in the scaled training image from a color value to a scaled value between −1 and 1;
   increasing the resolution of the scaled training image by applying a convolutional neural network to the scaled training image having the changed pixel values to form an output image;
   comparing the training image to the output image using a cost function; and
   determining weights and bias values for one or more layers of the convolutional neural network based on the comparing, the weights and bias values determined to minimize an output of the cost function that compares the training image to the output image, the convolutional neural network applied to additional images to increase the resolution of the additional images for presentation in the digital magazine.

2. The method of claim 1, wherein the convolutional neural network comprises:
   a convolutional layer for determining features present in the training image; and
   a dense layer for increasing image resolution.

3. The method of claim 2, wherein the convolutional neural network further comprises a linear Gaussian dense layer.

4. The method of claim 2, wherein the convolutional neural network further comprises a second convolutional layer and a second dense layer.

5. A system for image scaling for a digital magazine comprising:
   a processor configured to execute modules; and
   a memory storing the modules, the modules executable to perform steps comprising:
      receiving a training image;
      scaling down the training image by reducing a resolution thereof;
      changing a pixel value of each pixel in the scaled training image from a color value to a scaled value between −1 and 1;
      increasing the resolution of the scaled training image using a convolutional neural network and the changed pixel values to form an output image;
      comparing the training image to the output image using a cost function; and
      determining weights and bias values for one or more layers of the convolutional neural network based on the comparing, the weights and bias values determined to minimize an output of the cost function that compares the training image to the output image, the convolutional neural network applied to additional images to increase the resolution of the additional images for presentation in the digital magazine.

6. The system of claim 5, wherein the convolutional neural network comprises:
   a convolutional layer for determining features present in the training image; and
   a dense layer for increasing image resolution.

7. The system of claim 6, wherein the convolutional neural network further comprises a linear Gaussian layer for image smoothing.

8. The system of claim 6, wherein the convolutional neural network further comprises a second convolutional layer and a second dense layer.

9. A non-transitory computer-readable storage medium storing executable computer program instructions for image scaling for a digital magazine, the instructions executable to perform steps comprising:
   receiving a training image;
   scaling down the training image by reducing a resolution thereof;
   changing a pixel value of each pixel in the scaled training image from a color value to a scaled value between −1 and 1;
   increasing the resolution of the scaled training image using a convolutional neural network and the changed pixel value to form an output image;
   comparing the training image to the output image using a cost function; and
   determining weights and bias values for one or more layers of the convolutional neural network based on the comparing, the weights and bias values determined to minimize an output of the cost function that compares the training image to the output image, the convolutional neural network applied to additional images to increase the resolution of the additional images for presentation in the digital magazine.

10. The computer-readable storage medium of claim 9, wherein the convolutional neural network comprises:
    a convolutional layer for determining features present in the training image; and
    a dense layer for increasing image resolution.

11. The computer-readable storage medium of claim 10, wherein the convolutional neural network further comprises a linear Gaussian layer for image smoothing.

12. The computer-readable storage medium of claim 10, wherein the convolutional neural network further comprises a second convolutional layer and a second dense layer.

* * * * *